United States Patent [19]

Smith

[11] Patent Number: 4,763,011

[45] Date of Patent: Aug. 9, 1988

[54] ULTRAVIOLET RADIATION ACTINOMETER

[75] Inventor: Gerald J. Smith, Wellington, New Zealand

[73] Assignee: The New Zealand Government Property Corporation, Wellington, New Zealand

[21] Appl. No.: 768,759

[22] Filed: Aug. 23, 1985

[30] Foreign Application Priority Data

Aug. 23, 1984 [NZ] New Zealand .................. 209325

[51] Int. Cl.$^4$ .............................................. G01J 1/48
[52] U.S. Cl. ................................ 250/372; 250/474.1; 250/482.1
[58] Field of Search .................... 250/372, 474.1, 482.1

[56] References Cited

FOREIGN PATENT DOCUMENTS 2067060 7/1981 United Kingdom ............. 250/474.1

OTHER PUBLICATIONS

Joshi et al., "Spin Trapping of Rad.–in UV Photolysis of Alkyl Disulfides", J. Org. Chem., 1981, 46, 3736–3738.

Swallow, A., *Rad. Chem. of Organic Comp.*, (1960), p. 210.

Calleor et al., ". . . Photolysis of $CH_3SSCH_3$ . . . ", Trans. Faraday Soc., (1970), vol. 66, pp. 1987–1995.

Halliday et al., *Fundamentals of Physics*, pp. 653–654, (1974).

Primary Examiner—Janice A. Howell
Assistant Examiner—Richard Hanig
Attorney, Agent, or Firm—Wegner & Bretschneider

[57] ABSTRACT

A meter for determining the integrated effect of the exposure of human skin to the sun's ultra-violet radiation by means that provide an instrument cheap enough to use on a wide scale. The World Health Organization sees "the greatest value" in a suitable instrument. The solar radiation is passed through a UV filter to a fused silica tube containing a disulphide solution which, under the action of ultra violet (UV) radiation, displays a wavelength response similar to that of the erythemal action spectrum.

10 Claims, 2 Drawing Sheets

ERYTHEMAL ACTION SPECTRUM AND DOSIMETER RESPONSE

ULTRAVIOLET RADIATION ACTINOMETER

BACKGROUND OF THE INVENTION

This invention relates to a device which measures an integrated intensity of the solar UV radiation responsible for erythema, and in particular to a pattern that relies on chemical changes that are caused by the radiation that is being measured, (that is, an Actinometer).

There are very many reasons for wanting to know the intensity of radiation that reaches the earth from the sun. The need can usually be allotted to one of two classes; for survey, to determine the relative or absolute intensity in a specific band of wavelengths and to compare the intensities at different times or places; and as a dosimeter, to determine whether or not, or when, a person or other sensitive object has had an assigned integrated dose. There have been many instruments that can be used in one or other of these classes, and it may be that the first class can be satisfied by a relatively small number of instruments for one survey, and is already well enough dealt with. For example, a survey was carried out to find what effect supersonic aircraft could have on the earth's climate by alteraring the transmission of UV through the upper atmosphere. There is a longstanding belief that sunlight of the wavelengths that cause sunburn also is responsible for skin cancer, and that it would be be profitable to know the relative intensity of the appropriate radiation (which is in the UV) at different sites and especially in different countries. For these inquiries it has been common to use electronic meters which are expensive. Indeed, it is their cost which prevents their use in large numbers to monitor radiation at many locations for the average project.

Berger, *Photochem. and Photobiol.* Vol. 24, p. 587 (1976) says that for UV radiation measurements in the erythemal or sunburn range of wavelengths, there are four types of intensity meter—chemical, filter, photodiode and fluorescent—and that the drawbacks of the four types are respectively:

(1) chemical cannot measure variations with time, (2) filters must be used with diffusers or collimators to see the whole sky, and so are insensitive, (3) photodiodes have been found to be unstable, (4) a fluorescent meter may have a spectrum that is not wanted.

The present meter is intended to work in the erythemal band and to integrate the received radiation with time. For this use, the disadvantage stated above for the chemical type does not apply.

World Health organization Environmental Health Criteria 14, says at p. 90:

"Measurement of solar UVR involves serious dificulties because of the need for accurate spectral discrimination at the shortest end of the solar spectrum. Few really practical, accurate, stray-light-free spectro-radiometers have been developed so far for use in the middle UVR region (UV-B). But if they can be perfected, such personal dosimeters would be of the greatest value."

Various erythemal UV actinometers (most are the subjects of patents) based on polysulphone films, aziridine compounds, solutions of triphenyltetrazolium chloride, 2-(2',4' dinitrobenzyl) pyridine, and 3'-[p-(dimethylamino)-phenyl]spiro-[fluorene-9,4'-oxazolidine]-2',5'-dione are known, but as erythemal monitors they are unsatisfactory, for their response spectra are not sufficiently close to that of the skin.

Another defect common to these actinometers is that they record by changes of colour, which are associated with changes to the wavelength dependences of their actinic responses.

The UV absorption spectrum of many disulphides is similar to the erythemal action spectrum. Further, it is known that principal products resulting from the absorption of UV radiation by a solution of a disulphide, in the absence of oxygen are thiols or sulphides, neither of which has UV absorptions which will alter the absorption spectrum of a partly photolyzed disulphide solution over the spectrum of solar radiation at the earth's surface, i.e., $\geq 295$ nm.

The photolysis of disulphides in a low-temperature organic glass has been studied. Much of the photochemistry of this system results as a consequence of the very low temperatures used.

The photolysis of organic disulphides in fluid solution has also been studied, but until now, because of the solvents used, side photoreactions occur in addition to the formation of thiol. These side rections prohibit the use of these solutions as actinometers.

SUMMARY OF THE INVENTION

It is an object of the present invention to provide a UV actinometer for the erythemal range that has not the drawbacks heretofore encountered, or that will at least supply the public with a useful choice.

Accordingly, the invention consists of a UV actinometer including a heat sealed vessel 2, 3 whose walls are transparent to solar UV radiation, containing a solution of a disulphide 1 dissolved in an organic solvent which can readily donate hydrogen atoms and a suitable UV filter 4 placed between the container and the source erythemal radiation. The solvent which can readily donate hydrogen atoms is completely transparent to UV radiation of wavelengths longer than 295 nm. The readout of the actinometer is accomplished by standard analytical techniques which take place outside the body of the actinometer solution.

BRIEF DESCRIPTION OF THE DRAWING

The invention is as described above but may be understood by reference to the figures attached which show the erythemal action spectrum and the wavelength response of the device and the physical embodiment of the invention.

DESCRIPTION OF THE PREFERRED EMBODIMENT

Figure 1:
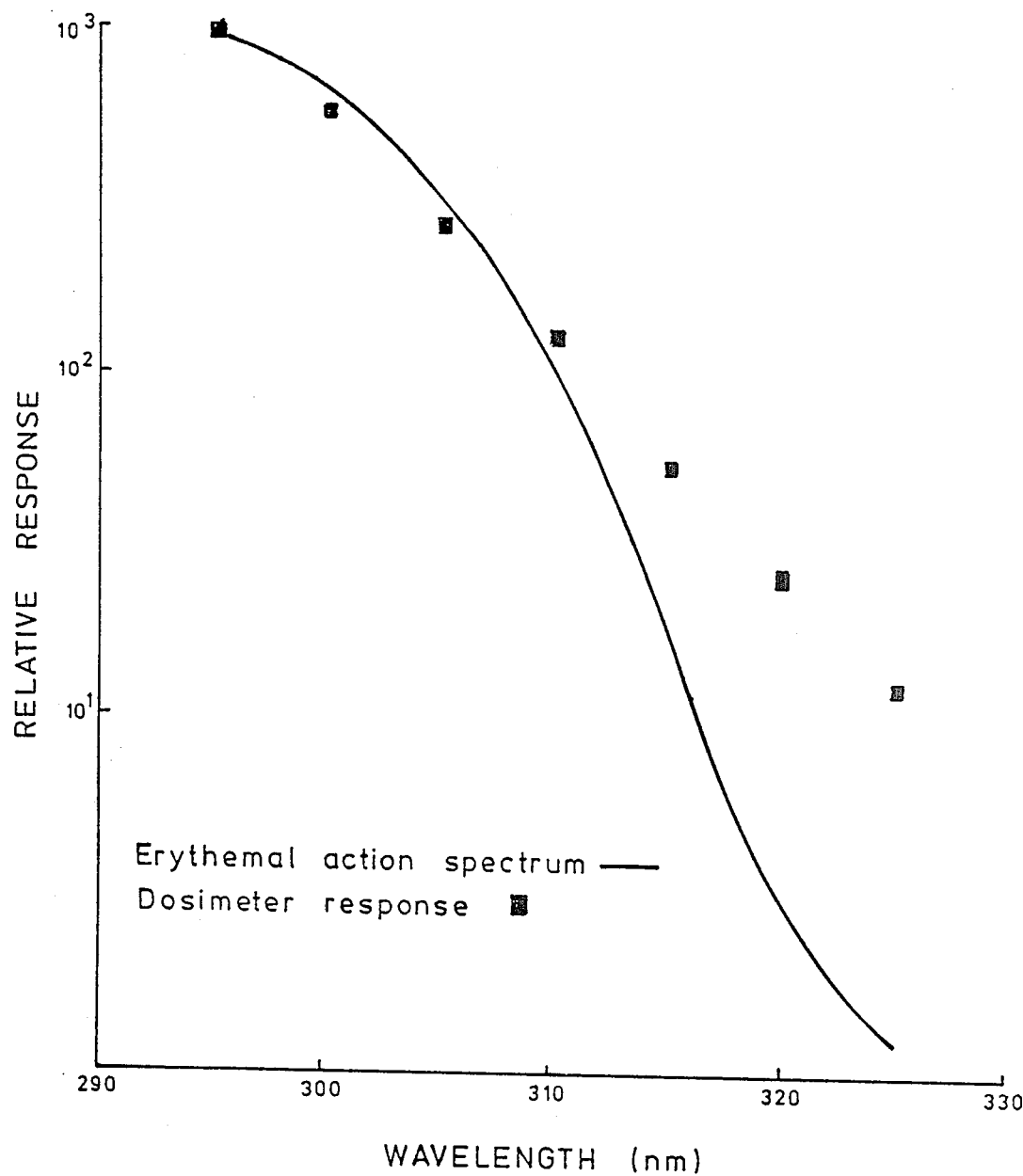
Figure 2:
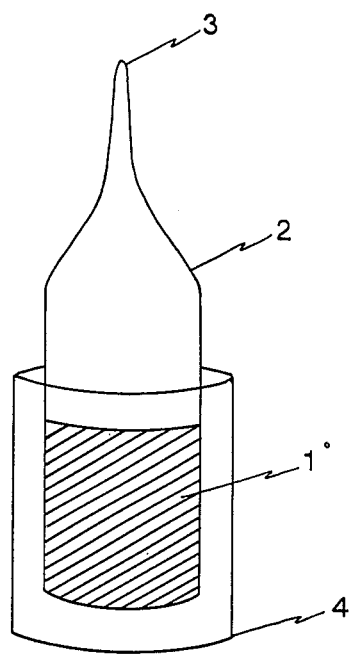

It has been found convenient to use as the actinic solution, an alkyl disulphide dissolved in a solvent which is capable of readily donating hydrogen atoms, such as $1 \times 10^{-3}$ mol.dm$^{-3}$ of dioctadecyldisulphide in methylcyclopentane. Photons of solar erythemal radiation cleave either the disulphide bond or the alkyl-sulphur bond to produce mono-sulphur free radicals or disulphide free radicals. The solvent rapidly reacts with these free radicals by donating a hydrogen atom to produce stable octadecylthiol or octadecyl disulphide and by doing so prevents addition reactions between the sulphur free radicals which can produce tri and higher poly sulphides. These chemicals absorb light in the solar erythemal wavelength range and would therefore interfere with the performance of the actinometer. The methylcyclopentane was first purified by passage through a column of activated silica gel (70–230 mesh). After preparation of the solution it was filtered to remove fine particulate matter. 0.1 ml of the solution 1 was contained in a 4 mm i.d. 12.40 mm long fused silica tube 2 where it was deoxygenated by bubbling with oxygen free nitrogen or by a series of freeze, pump, thaw cycles. The tube was then sealed off 3 with a flame. A front UV filter 4 placed between the actinometer solution and the source of UV to improve the match of the actinometer to the erythemal action spectrum was prepared by soaking a piece of 35 üm thick uncoated cellophane film in an aqueous solution of 2,7-dimethyl-3,6-diazacyclohepta 1,6-diene perchlorate for 48 hours to give a transmission to radiation at 300 nm of 12%. The film was then dried under vacuum and allowed to come to equilibrium with atmospheric moisture. The treated film was then wrapped once around the fused silica tube containing the actinic solution.

Alternative front UV filters are: (a) a 7 mm pathlength of dry chlorine gas at atmospheric pressure in a fused silica cell, or, (b) a film of cellophane containing Macrolex Yellow 3G as described by Fanselow et al., *J. Amer. Acad. Dermatol.* 9, 714 (1983). No doubt other filter materials could be used provided they are sufficiently stable to UV radiation.

This design has been found to have a sensitivity appropriate to measuring the integrated intensity of solar erythemal radiation over a one week period. The sensitivity of the device can be changed by changing the disulphide concentration and/or the light pathlength of the solution or by introducing UV attenuation. This allows the device to measure radiation over different periods of time.

After exposure of the device for the desired time the dose of solar erythemal radiation which has fallen on the actinic solution was determined by measuring the amount of octadecylthiol produced and comparing this with the amounts of octadecylthiol produced in similar actinic solutions by doses of solar erythemal radiation which had been independently measured by a calibrated radiometer. This radiometer consisted of a Kratos GM 301D/6 double monochromator which had a 10 mm thick teflon sheet as a diffuser placed in front of the entrance slit to produce a cosine response and a IP21 photomultiplier tube attached to the exit slit.

The quantity of octadecylthiol produced by the erythemal radiation in the actinic solution was determined by injecting 1 ml aliquots of exposed solution into a gas chromatograph fitted with a 2 m, OV17 column which was temperature programmed from 170° to 230° C. The octadecylthiol was detected by a flame ionization dector and the resultant peak in the chromatogram was integrated digitally. This integrated peak was routinely compared with that obtained from a standard solution of octadecylthiol of known concentration. Alternatively, the fluoremetric methods using The erythemal action spectrum and dosimeter response curve are shown in the attached FIG. 1. The curve of the erthemal action spectrum was obtained from the results of Berger referred to in Berger: *Photochem and Photobiol.* Vol. 24, P. 587 (1976). The data for the dosimeter response were obtained from the filter transmission and the absorption of the disulphide solution measured at each wave length.

What is claimed is:

1. An integrating device comprising means for monitoring solar erythemal radiation said means comprising a disulphide chemical in solution which undergoes a photochemical change, the extent of the change depending on the dose of erythemal UV radiation to which the device has been exposed, said disulphide chemical dissolved in a solvent capable of readily donating hydrogen atoms and which is completely transparent to UV radiation of wavelengths longer than 295 nm.

2. A device as claimed in claim 1 in which the disulphide is a dialkyl disulphide having a high molecular weight.

3. A device as claims in claim 2 wherein this solvent is methylcyclopentane.

4. A device as claimed in claim 1 wherein said device further comprises is contained in a UV transparent solution container.

5. A device as claimed in claim 3 further comprising a UV filter between the container and the source of erythemal UV radiation, wherein said UV filter has a transmission spectrum which, combined with the absorption spectrum of the disulphide, gives a wavelength response for the complete device which matches the erythemal action spectrum of the skin.

6. A device as claimed in claim 1 in which oxygen is removed from the disulphide solution and the solution container is made of material which prevents oxygen from re-entering the solution prior to, and over the period of exposure to UV radiation.

7. A device as claimed in claim 1 where products of photoreactions occurring in the actinometer do not absorb in the UV spectral region in such a way as to alter the response spectrum of the disulphide solution to external radiation in the wavelength range from 295 nm to 340 nm.

8. A device as claimed in claim 1 wherein the means for monitoring the integrated intensity of solar erythemal UV radiation comprises means for measuring the quantity of disulphide which has disappeared from the solution.

9. A device as claimed in claim 1 wherein the means for monitoring the integrated intensity of solar erythemal UV radiation comprises means for measuring the amount of one of the products formed after exposure of the device to solar radiation.

10. A device as claimed in claim 6, wherein the solution container is made of fused silica.

* * * * *